(No Model.) 5 Sheets—Sheet 1.

F. G. BECKER.
HARVESTER RAKE AND REEL.

No. 351,019. Patented Oct. 19, 1886.

WITNESSES
Ed. A. Newman.
Al. C. Newman.

INVENTOR
Frederick G. Becker,
By his Attorneys

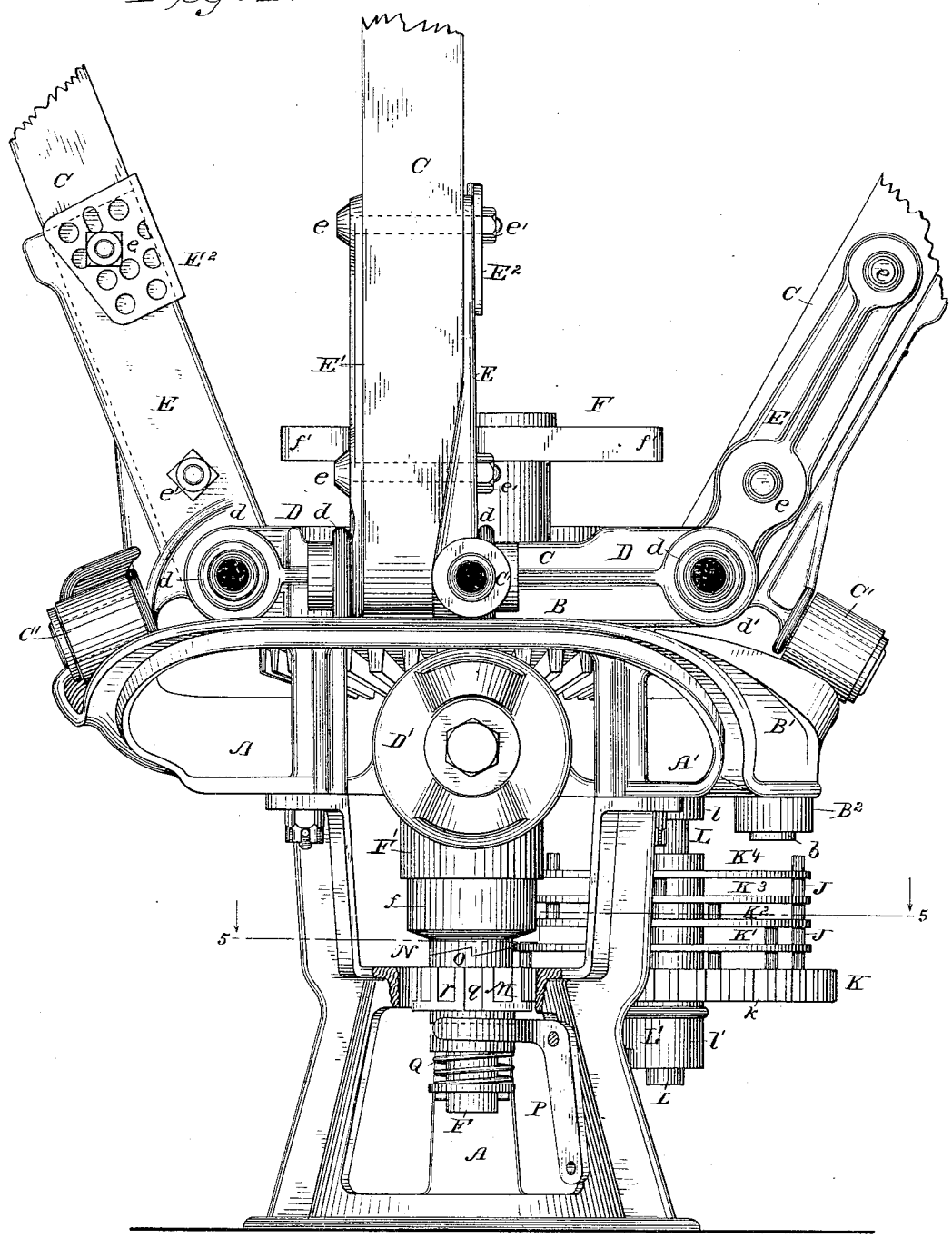

(No Model.) 5 Sheets—Sheet 3.
F. G. BECKER.
HARVESTER RAKE AND REEL.
No. 351,019. Fig. 3. Patented Oct. 19, 1886.
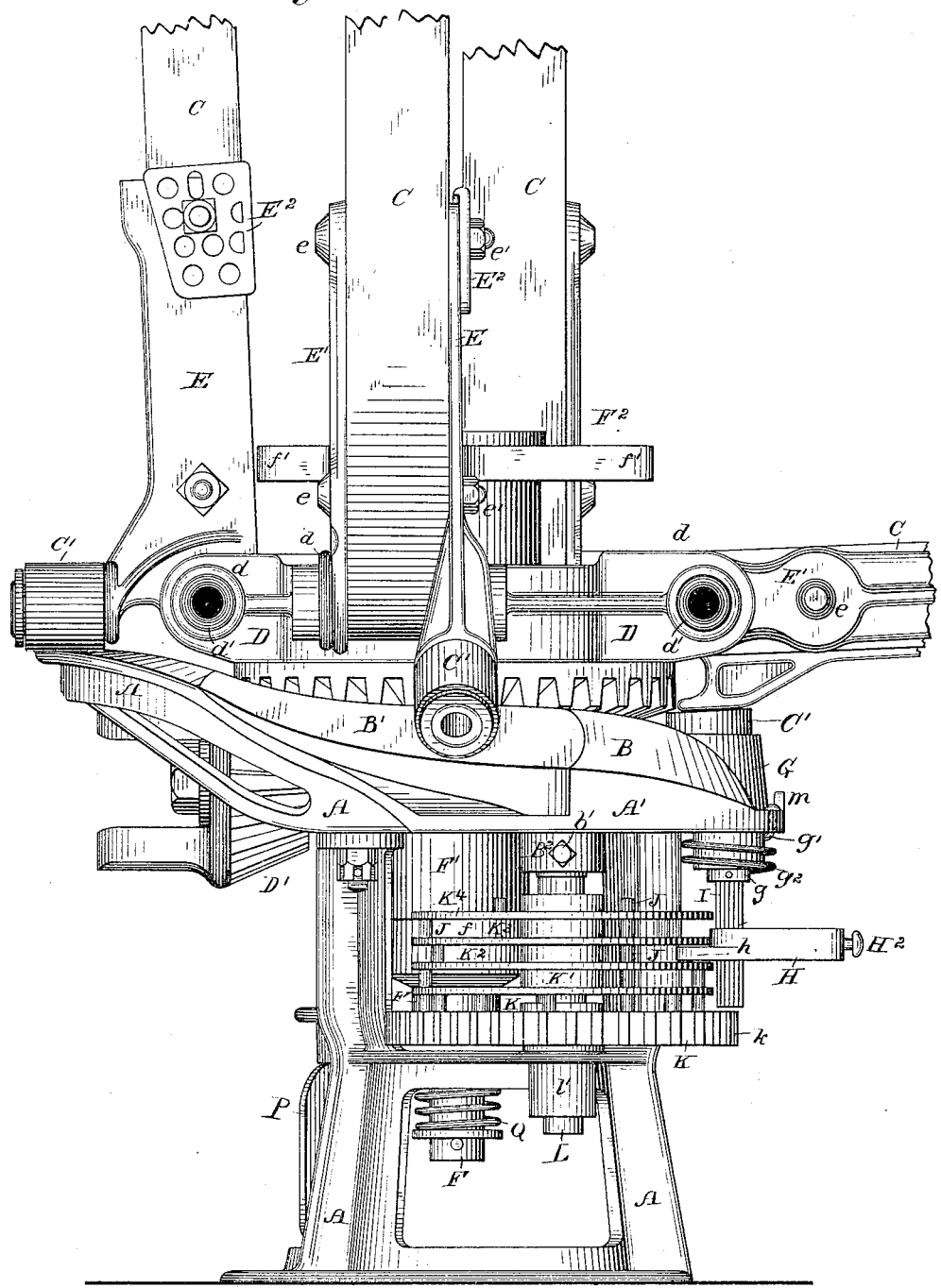
WITNESSES
Ed. A. Newman
Al. C. Newman
INVENTOR
Frederick G. Becker;
By his Attorneys (No Model.)  5 Sheets—Sheet 4.
F. G. BECKER.
HARVESTER RAKE AND REEL.
No. 351,019. Patented Oct. 19, 1886.
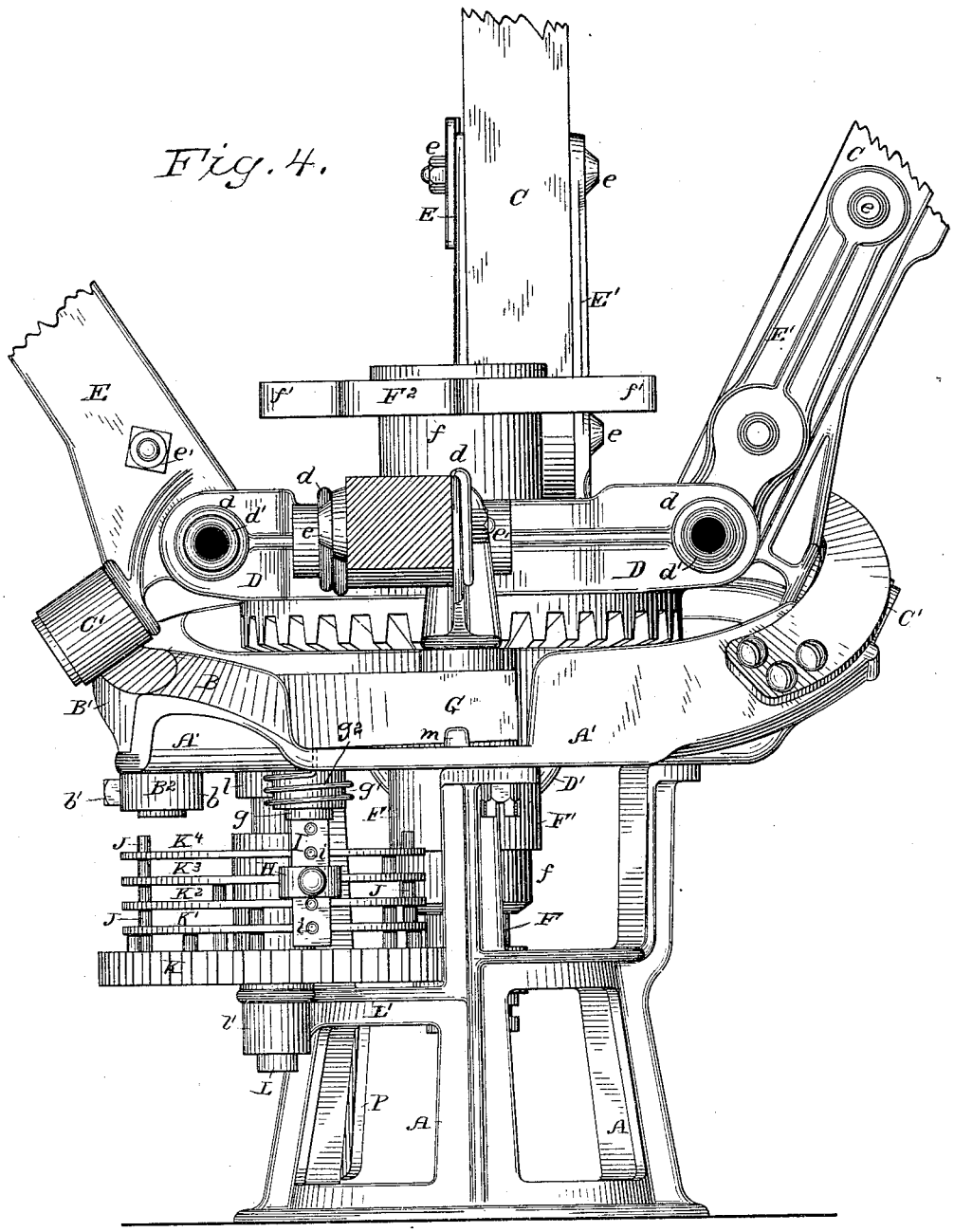
WITNESSES  INVENTOR
Ed. A. Newman.  Frederick G. Becker,
Al. C. Newman.  By his Attorneys (No Model.)  5 Sheets—Sheet 5.

F. G. BECKER.
HARVESTER RAKE AND REEL.

No. 351,019.  Patented Oct. 19, 1886.

WITNESSES
Ed. A. Newman.
Al. C. Newman.

INVENTOR
Frederick G. Becker,
By his Attorneys

UNITED STATES PATENT OFFICE.

FREDERICK G. BECKER, OF BROCKPORT, NEW YORK, ASSIGNOR TO D. S. MORGAN & COMPANY, OF SAME PLACE.

HARVESTER RAKE AND REEL.

SPECIFICATION forming part of Letters Patent No. 351,019, dated October 19, 1886.

Application filed September 3, 1885. Serial No. 176,087. (No model.)

*To all whom it may concern:*

Be it known that I, FREDERICK G. BECKER, of Brockport, in the county of Monroe and State of New York, have invented certain new and useful Improvements in Harvester Rakes and Reels, of which the following is a specification.

My invention relates to improvements applicable to rakes and reels of the class having continuously-rotating rising and falling combined rake and reel arms, and provided with controlling mechanism for adjusting and predetermining the action of the rakes to cause them to operate automatically upon the cut grain at regular intervals—longer or shorter, according to adjustment of the controlling mechanism—to suit the conditions of the crop being cut, and for intermitting the automatic raking action, as desired.

Figure 1:
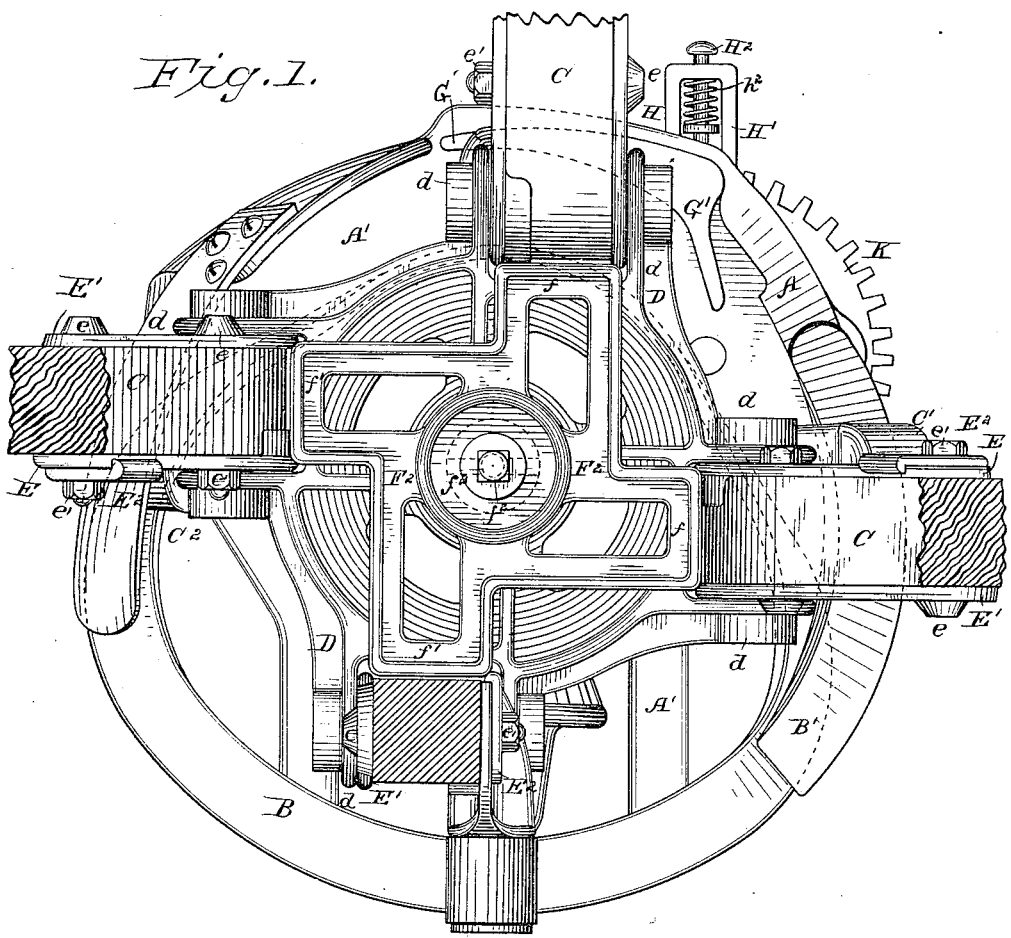
Figures 7, 8:
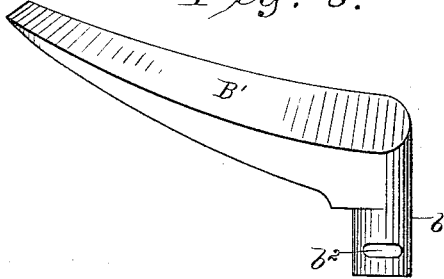
Figure 5:
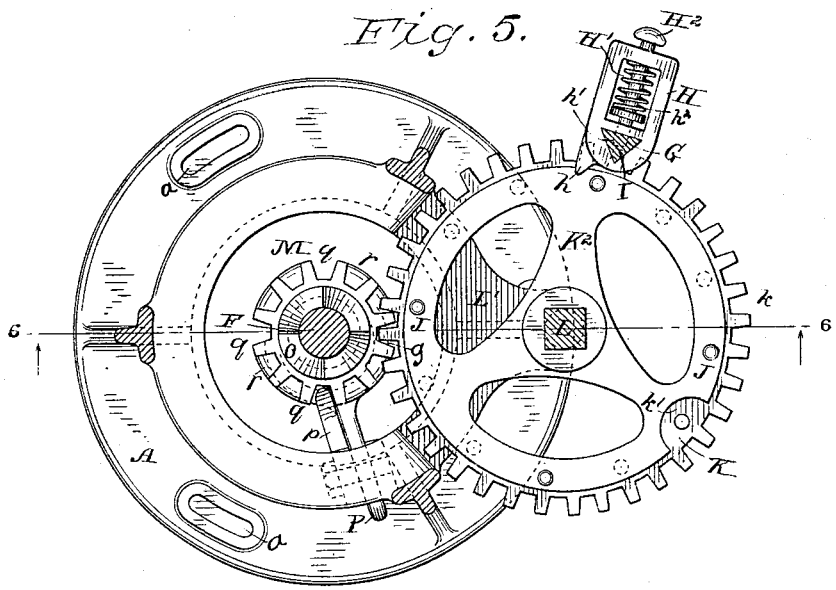
Figure 6:
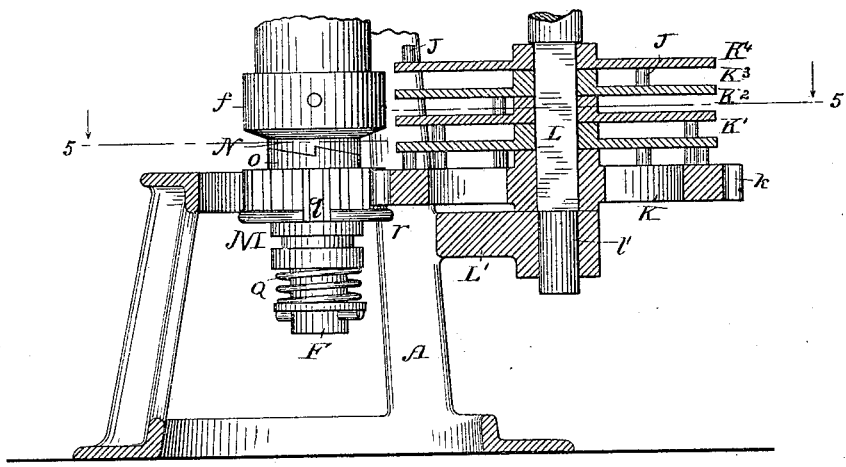

In the accompanying drawings, which show those parts of a combined rake and reel, illustration and description of which are sufficient to convey a proper understanding of a suitable embodiment of my improvements, Figure 1 is a plan or top view with parts broken away or in section, there being in this instance provided four continuously-rotating rising and falling combined raking and reeling arms. Fig. 2 is an elevation as seen from the inner side. Fig. 3 is a rear elevation. Fig. 4 is an elevation as seen from the outer side. Fig. 5 is a view, partly in plan and partly in section on the lines 5 5 of Figs. 2 and 6, showing details of the rake-controlling mechanism; Fig. 6, a view partly in elevation and partly in section on the line 6 6 of Fig. 5. Fig. 7 is a view in elevation of a cam-gate, which is actuated by the rake-controlling mechanism, detached; and Fig. 8, a similar view of a pivoted section of the cam-track detached.

A suitable rake support or stand, A, is to be secured, as usual, upon the heel end of the finger-beam or inner front corner of the platform of a harvester by bolts passing through slots $a$ in the base of the stand. A casting, A', constituting the main section B of a rake-controlling cam—such in general features of construction as heretofore commonly employed with rakes of this class—is supported by the rake-stand, to which it is detachably secured by bolts. The cam-track-traveling rollers C' of the respective rake-arms C pass once during each revolution of the rake-arms either inside of or outside of and upon the pivoted section B' of the cam-track, according to whether the teeth of the rake-arms act upon the cut grain on the platform or pass above it, as is well understood. The rake-teeth (not shown) are of the non-oscillating type, being fixed to the rake-arms in any suitable well-known way, and the pivoted cam-track section B' is shown as mounted in position by a downwardly-projecting pivot-stud, $b$, at its heel end, supported in a bearing, B², in the cam-casting A'. A set-screw or securing-bolt, $b'$, in the bearing B² engages a slot, $b^2$, in the pivot-stud and limits the outward movement of vibration of the cam-section. The rake-arms C, any desired number of which may be employed, have jointed connection with a suitable rotating rake-carrier, D, shown as consisting of the usually-employed crown-wheel driven by a pinion, D'. This pinion is to be actuated by a tumbling-shaft in well-known way. As shown, each rake-arm is jointed to and between a pair of lugs, $d\ d$, of the carrier D by means of a sectional bracket consisting of two parts, E E', which are clamped against the opposite sides of the rake-arm at its heel end and adjustably secured by bolts $e\ e$, nuts $e'\ e'$, and a clamp-plate, E². The bracket-sections have trunnions $d'\ d'$, pivotally supported in bearings in the lugs $d\ d$. The rake-arms have a movement of vertical vibration only independently of their carrier. Each bracket-section E carries one of the cam-track-traveling rollers C' upon a laterally-projecting stud at its heel. The driving-pinion D' of the rake-gearing is mounted on a stud-shaft cast with the rake-stand, and the rotating rake-carrier D is provided with a long hub, $f$, by which it is mounted fast on the rake-shaft F, turning in a suitable bearing, F', shown as formed integral with the cam-casting A'. Upward and inward movement of the rake-arms to an objectionable extent is prevented by a rotating stop, F², removably secured upon the top of the rake-shaft. As this stop turns with the rake-shaft, its arms $f'$, corresponding in number with and projecting toward the rake-arms, serve to check the movement of vibration of the rake-arms, as will readily be understood. A clamp bolt, $f^2$, provided with a washer, holds the stop down to the rake-shaft. By removing the clamp-bolt the stop can be detached. As an additional security against accidental displacement or movement of the stop independently of the rake-shaft, the stop is provided with downwardly-projecting lugs on its under side, (see dotted lines, Fig. 1,) to fit into corresponding recesses in the top of the rake-shaft, as will be obvious. A vibrating cam-gate, G, for controlling the path of travel of the cam-track-traveling rollers C', in order that the rake-arms may be caused to act simply as reels, or as both reels and rakes, is actuated as in turn to be described, and constructed as follows: The cam-gate is formed with the short angularly-arranged heel G', has a pivot-stud, $g$, by which it is mounted so as to vibrate in a suitable bearing, $g'$, formed with the cam-casting A'. A spring, $g^2$, secured at one end to the pivot-stud and at the other to the cam-casting, acts with a tendency to hold the cam-gate closed. When the cam-gate is open, and the roller C' of a rake-arm travels inside of it, as during a raking action, (see Fig. 1,) the heel of the cam-gate projects into the path of travel of the roller, and the closing of the cam-gate by the positive action of the roller upon its heel is thus insured, as will be obvious. The pivot-stud $g$ of the vibrating cam-gate is prolonged to constitute a supporting arm or shank, I, for making supporting-connection between the cam-gate and a vibrating tripper, H, by the actuation of which the gate is opened. As shown, the shank I is of triangular form in cross-section, and has a number of holes, $i$, in it, arranged in a vertical row, to facilitate the adjustment and clamping in position of the tripper. When clamped in position, the tripper has rigid connection with the cam-gate, it should be noticed. This tripper, as represented, is formed with a nose, $h$, a socket, $h'$, by which it is fitted to and adapted to slide lengthwise of the shank, connecting it with the cam-gate, and an opening, H, in its body, in which is located the spring $h^2$ of an endwise-sliding spring-actuated securing-pin, $H^2$. This pin is supported in obvious way in bearings in the tripper, and at its point engages with one or other of the holes $i$ in the shank, whereby it is rigidly and adjustably connected with the cam-gate. The securing-pin is provided with a head, by grasping which the pin may be moved against the force of its spring and its point withdrawn from engagement with the cam-gate shank when it is desired to shift the position of the tripper.

Rotating tripper-actuating mechanism operating upon the vibrating tripper H to automatically control the operation of the rakes, is provided as follows: Tappets J, to act upon the nose $h$ of the tripper, are arranged upon rotating carriers, in this instance five in number, four of these rotating tappet-carriers, K', $K^2$, $K^3$, and $K^4$, being of simple wheel-like form, consisting of rims or ring-like portions united by spokes with central bearings or hubs, and the remaining carrier, K, being of similar construction, except that it is provided with peripheral gear-teeth $k$. The tappets J are shown as formed by round pins secured vertically to the upper sides of the rims or ring portions of the carriers; but the tappets may be otherwise provided—as, for instance, by suitable projections cast with the carriers. Each rotating carrier, except the toothed one, K, has a peripheral notch, $k'$. The separately-formed rotating carriers are mounted one above another upon an upright shaft, L, with which they turn. As shown, the toothed carrier is the lowermost one of the series. That part of the carrier-shaft which is embraced by the hubs of the carriers is squared, and the bearing-openings of the hubs are correspondingly shaped, for obvious purpose. The carrier-shaft is journaled at its opposite ends in bearings $l\ l'$, formed, respectively, in the cam-casting and in a bracket-arm, L', of the rake-stand.

The above-described rotating tripper-actuating mechanism is shown as driven by gearing-connection with the rake-driving mechanism, and as the rake-controlling mechanism is, in this instance, organized, the shaft L of the rotating tripper-actuating mechanism makes one revolution for every three revolutions of the rake-shaft. The lower or toothed tappet-carrier, K, has twelve tappets. The carrier K', next above, is provided with six tappets; the next carrier, $K^2$, with four tappets; the next carrier, $K^3$, with three tappets; and the topmost carrier, $K^4$, with two tappets. The tappets are arranged upon the carriers K, K', $K^2$, and $K^3$, respectively, at equal distances apart, and the two tappets of the carrier $K^4$ are arranged diametrically opposite each other. The result of this organization is that when the cam-gate is opened at regular intervals by the operations of the tripper H, as actuated by the tappet-carrier K, every rake-arm becomes in turn a rake. When the tappet-carrier K' operates the tripper, every other rake-arm performs a raking action. When the tappet-carrier $K^2$ actuates the tripper, every third rake-arm rakes. When the tappet-carrier $K^3$ actuates the tripper, there is a raking action by every fourth rake-arm, or once for every revolution of the rake-carrier D; and when the tappet-carrier $K^4$ acts on the tripper there is a raking action by every sixth rake-arm, or once for every one and one-half revolution of the rake-carrier.

The above-explained normal or regular automatic operations of the rake-arms, resulting from controlling them by way of the cam-gate, the tripper, and the rotating tripper-actuating mechanism, may be varied as desired by intermitting the raking actions of the rake-arms, as further on to be explained.

To adjust the tripper so that its nose will be presented to the action of the tappets of any desired tappet-carrier, the securing-pin $H^2$ is pulled outward, and the tripper moved up or down, as required. The tappet-carriers are placed upon the shaft in such manner that their peripheral notches $k'$ register or come one above another over a tappet of the toothed carrier. When, therefore, these notches are opposite the shank of the cam-gate, provision is made for the unobstructed passage of the nose of the tripper from one tappet-carrier to another as the tripper is adjusted. I prefer for a purpose further on made obvious to limit the outward movement of vibration of the cam-gate, as by means of a stop, $m$, on the cam-casting, so that the tripper cannot be adjusted, except at a time when its nose may enter the notches $k'$.

The rotating tripper-actuating mechanism is operated by the rake-driving mechanism, and provision made for intermitting the raking actions of the rake-arms in the following way: A pinion, M, on the rake-shaft imparts motion to the tappet-carrier shaft by engaging with the teeth of the tappet-carrier K. This driving-pinion M has clutch-connection with the rake-shaft, so that it may be caused to turn with this shaft or be left free, in order that the rake-shaft may continue to rotate without imparting motion to the pinion. The clutch is of ordinary construction. Its upper member, N, is fast on the rake-shaft, and its lower member, O, slides with the loosely-mounted tappet-driving pinion on the rake-shaft. A forked clutch-controller, P, pivotally attached to the rake-stand, engages an annular groove in the hub of the pinion, and a spring, Q, acts upon the pinion with a tendency to hold the two members of the clutch engaged, or else to move the sliding member into engagement with the fast member of the clutch.

A suitable connection between the clutch-controller and a lever within reach of the driver upon a machine to which my improvements may be applied would provide for actuating the clutch as desired.

I have deemed it unnecessary to show devices to be operated by the driver of the machine for actuating the clutch-controller, as they may be constructed and operated in any of the appropriate well-known ways. When the clutch-controller is operated to throw the pinion M out of clutch with the rake-shaft and this pinion ceases to rotate, the tripper-actuating mechanism simultaneously comes to rest, thus preventing actuation of the tripper and leaving the rake-arms to perform simply the functions of reels as they rotate with their carrier. As there are in this instance employed four combined rake and reel arms the rotation of which relatively to that of the tappet-carriers is so timed (the tappet-carrier K has thirty-six teeth to twelve teeth of the pinion M) that the rake-arms make three revolutions with the rake-shaft for every revolution of the tappet-carriers when in action, and as under this organization there are required twelve tappets upon one of the tappet-carriers (the carrier K) to provide for automatically throwing every rake-arm into action as a rake when the tripper H is adjusted to be acted upon by the carrier K, it follows that in order to intermit these automatic operations at will there must be provision made for throwing the tappet-carrier K out of action at intervals in its revolution corresponding to twelve parts of a complete revolution.

To throw the tappet-carriers out of action at intervals of twelfths of revolutions requires that provision be made for throwing their driving-pinion M out of action at intervals of fourths of revolutions. This pinion is therefore so arranged relatively to a fixed stop, $p$, shown as formed by a lug of the rake-stand, that it may be moved downward only when some one of four stop-engaging grooves, $q$, at equal distances apart about the pinion (shown as formed by spaces between its teeth) is over or in register with this stop. The respective groups of teeth of the pinion between these stop-engaging grooves $q$ are connected at their lower surfaces by flanges $r$. (See Figs. 2, 5, and 6.)

In putting together the mechanism the tappet-carrier K and its driving-pinion are so adjusted relatively to each other that this pinion cannot be actuated by the clutch-controller at times when any tappet of this carrier is in position to engage with the tripper. As the driving pinion when out of clutch and still engaging by its teeth with the teeth of the tappet-carrier is locked by engagement with the stop $p$, the organization of the mechanism so that when the pinion is unclutched the nose of the tripper shall be between tappets or not in engagement with one of them is important, for were it possible to stop the revolution of the tappet-carriers and lock them against turning at a time when the cam-gate had been partially opened by the action of a tappet on the tripper the cam-gate would be dogged in such position, and contact of a cam-track-traveling roller with the gate would result in damage to the mechanism. The number of tappets (twelve) of the toothed carrier K being a common multiple of the numbers of tappets (six, four, three, and two,) with which the remaining carriers of the series are respectively provided, every tappet of these remaining carriers may be arranged, as shown, over or in vertical line with some one of the tappets of the carrier K. The result of this arrangement, obviously, is to guard against the control of the cam-gate by the action on the tripper of any of the tappet-carriers at times when control of the cam-gate might result in injury. The notches $k'$ of the tappet-carriers K' K² K³ K⁴ serve not only to indicate the proper adjustment in setting up the parts, but also as a means for guarding against improper adjustment of the tripper, as when the outward movement of the cam-gate is limited by the stop $m$, the tripper can only be adjusted when its nose is in position to be moved by way of these notches from one tappet-carrier to another by the sliding of the tripper along the cam-gate shank. In this way it will be seen that provision is made for most effectually preventing derangement of the mechanism, the tripper being adjustable only when in proper position relatively to the tappets.

From the above description it will be understood that when the mechanism is adjusted to cause the desired automatic raking operations, these operations may be intermitted at will by actuating the clutch of the rake-controlling mechanism, and then allowed to go on again, and that the tappet-carriers can readily be turned to bring them into position for adjustment of the tripper by stopping the machine, if at work, throwing the tumbling-shaft of the rake-driving mechanism out of gear by commonly-employed means, and turning the rake-carrier by hand by way of the rake-arms.

It should be particularly noticed that in accordance with my improvements I employ normally-rotating tripper-actuating mechanism having driving-connection with the rake-rotating mechanism, together with means by which to throw the tripper-actuating mechanism out of gear with the rake-rotating mechanism to stop the rotation of this tripper-actuating mechanism when it is not desired to have it act upon the tripper of the cam-gate, and in this way provide for intermitting the raking actions, instead of by operating the tripper to so adjust it as to prevent it from being actuated, which operation of the tripper to adjust it would be necessary were not provision made for controlling the raking actions by throwing the tripper-actuating mechanism into and out of gear with its driving mechanism.

I do not wish to be understood as confining my invention to the details of construction and precise arrangement of parts hereinbefore particularly pointed out or suggested, as my improvements may be modified in various ways. For instance, the cam-gate and the tripper-connecting shank may be separately made and suitably connected with each other, instead of being formed together. A greater or lesser number of tappet-carriers may be employed, one only being used under some circumstances, if preferred.

The heel of the cam-gate may be dispensed with and the spring be wholly relied upon to close the gate. Five or more rake-arms may be used in connection with suitable and obvious changes in the rotating tripper-actuating mechanism and its driving-pinion. The rotating tripper-actuating mechanism may consist of cam-carriers instead of tappet-carriers, each carrier being provided with a suitably-formed cam for acting on a stud or roller to be substituted for the nose of the tripper. Neither do I wish to be understood as unqualifiedly claiming governing the raking actions of combined rake and reel arms by operating the gate of a rake-controlling cam by a tripper automatically actuated by rotating mechanism driven by gearing connected with the rake-driving mechanism, as, broadly considered, this is older than my invention.

I claim as of my own my invention—

1. The combination of the rotating rake-carrier, the rake arms jointed thereto, and the rotating rake-stop supported between the rake-arms above the rake-carrier, and having arms projecting toward the rake-arms, substantially as and for the purpose set forth.

2. The combination of the rotating rake-carrier, the rake-arms jointed thereto, the rotating rake-shaft, and the rotating stop removably secured upon the rake-shaft for limiting upward movement of the rake-arms, substantially as set forth.

3. The combination, substantially as set forth, of the cam-gate, the tripper having connection therewith, the rotating tripper-actuating mechanism, the rake-driving mechanism, the pinion having clutch connection with and driven by the rake-driving mechanism for operating the tripper-actuating mechanism, the clutch-controller, and the stop engaging said pinion when actuated by the clutch-controller, for the purpose set forth.

4. The combination, substantially as set forth, of the cam-gate, the tripper, the rotating tripper-actuating mechanism, the rake-shaft, the pinion provided with stop-engaging grooves, having clutch-connection with the rake-shaft and gearing with the tripper-actuating mechanism, the clutch-controller, and the fixed stop engaging the pinion-grooves when this pinion is actuated by the clutch-controller, for the purpose described.

5. The combination of the cam-gate, the tripper having adjustable supporting-connection therewith, the rotating tappet carriers having the peripheral notches, the toothed tappet-carrier, the shaft with which the tappet-carriers rotate, driving-mechanism for rotating the tappet-carriers and clutch mechanism for throwing the tappet-carriers out of action, substantially as and for the purpose set forth.

6. The combination of the cam-gate, the tripper having adjustable supporting-connection therewith, the rotating tappet-carriers having the peripheral notches, the toothed tappet-carrier, the shaft with which the tappet-carriers rotate, the rake-shaft, the driving-pinion thereon for actuating the tappet-carriers, the clutch connecting the driving-pinion with the rake-shaft, the clutch-controller, and the stop engaging the driving-pinion when actuated by the clutch-controller, substantially as and for the purpose set forth.

In testimony whereof I have hereunto subscribed my name.

FREDERICK G. BECKER.

Witnesses:
E. T. LAMB,
CHARLES IRWIN.